United States Patent
Anderson

(10) Patent No.: US 10,914,219 B2
(45) Date of Patent: Feb. 9, 2021

(54) HEAT SHIELD FOR A MARINE ENGINE EXHAUST SYSTEM

(71) Applicant: Indmar Products Company, Inc., Millington, TN (US)

(72) Inventor: Timothy G. Anderson, Munford, TN (US)

(73) Assignee: Indmar Products Company, Inc., Millington, TN (US)

(*) Notice: Subject to any disclaimer, the term of this patent is extended or adjusted under 35 U.S.C. 154(b) by 83 days.

(21) Appl. No.: 16/448,751

(22) Filed: Jun. 21, 2019

(65) Prior Publication Data

US 2020/0256255 A1     Aug. 13, 2020

Related U.S. Application Data

(60) Provisional application No. 62/804,790, filed on Feb. 13, 2019.

(51) Int. Cl.
| | |
|---|---|
| F01N 3/32 | (2006.01) |
| F01N 3/22 | (2006.01) |
| F02B 37/16 | (2006.01) |
| F01D 25/14 | (2006.01) |
| F02C 7/24 | (2006.01) |

(52) U.S. Cl.
CPC .............. *F01N 3/32* (2013.01); *F01D 25/14* (2013.01); *F01N 3/222* (2013.01); *F02B 37/168* (2013.01); *F02C 7/24* (2013.01); *F05D 2220/40* (2013.01); *F05D 2260/231* (2013.01)

(58) Field of Classification Search
CPC .......... F01N 3/23; F01N 3/222; F02B 37/168; F02B 39/005; F02C 7/24; F02C 7/16; F01D 25/26; F01D 25/145
See application file for complete search history.

(56) References Cited

U.S. PATENT DOCUMENTS

| | | | | |
|---|---|---|---|---|
| 8,356,581 | B2* | 1/2013 | Fletcher | F02B 63/04 123/41.31 |
| 8,365,526 | B2* | 2/2013 | Stiermann | F01N 5/02 60/599 |
| 8,826,661 | B2* | 9/2014 | Takahata | F02B 39/005 60/605.3 |
| 2005/0188943 | A1* | 9/2005 | Gonzalez | F02B 61/04 123/245 |
| 2017/0214789 | A1* | 7/2017 | Jung | H04W 4/16 |

FOREIGN PATENT DOCUMENTS

| | | | | |
|---|---|---|---|---|
| DE | 3438738 A1 * | 4/1986 | | F16B 19/1081 |
| WO | WO-2015073358 A1 * | 5/2015 | | F01D 25/15 |

OTHER PUBLICATIONS

Espacenet translation of DE 3439738 A1 (Year: 1986).*

* cited by examiner

*Primary Examiner* — Nathaniel E Wiehe
*Assistant Examiner* — Ryan C Clark
(74) *Attorney, Agent, or Firm* — Wood Herron & Evans LLP

(57) ABSTRACT

A heat shield includes an outer jacket including a fluid inlet port and a fluid outlet port, and an inner jacket nested within the outer jacket and spaced apart therefrom to define a fluid passageway therebetween. The fluid passageway is in fluid communication with the fluid inlet port and the fluid outlet port for directing a cooling fluid from the fluid inlet port to the fluid outlet port through the fluid passageway. The inner jacket at least partially defines a main cavity configured to at least partially protect a turbocharger of the marine engine.

20 Claims, 6 Drawing Sheets

HEAT SHIELD FOR A MARINE ENGINE EXHAUST SYSTEM

CROSS REFERENCE TO RELATED APPLICATION

The present application claims the benefit of U.S. Provisional Patent Application Ser. No. 62/804,790, filed on Feb. 13, 2019, the content of which is incorporated by reference in its entirety.

TECHNICAL FIELD

The present invention relates generally to marine engines and, more particularly, to devices and methods for shielding heat associated with forced induction or "boosted" marine engines.

BACKGROUND

Various marine crafts such as motorboats may be outfitted with forced induction or "boosted" marine engines for increasing the efficiency and power output of the engine. Such forced induction marine engines may be equipped with an air intake and exhaust system that includes a turbocharger, for example. One type of turbocharger includes a radial turbine having a rotor and further includes an air compressor such as a centrifugal compressor having an impeller. The turbine may be positioned within the exhaust subsystem and configured to extract energy from the exhaust gases emitted from the engine, while the compressor may be positioned within the air intake subsystem and configured to transfer the extracted energy to fresh air within the compressor. The resulting compressed air is directed to an intake manifold of the engine to provide forced induction to the engine such that the engine may be "boosted." In some cases, the engine may be equipped with multiple turbochargers. For example, the engine may be equipped with a twin turbocharger (e.g., having two turbochargers).

While turbochargers may be effective for their intended purpose of increasing the efficiency and power output of the engine, the turbines and compressors of such turbochargers typically operate at relatively high temperatures. For example, during normal operation the temperature of the turbine may be approximately 1,800° F. and the temperature of the compressor may be approximately 400° F. However, it is typically desirable to prevent the temperature of any surface on or associated with the marine engine that can come into contact with persons or gear from exceeding 200° F. Thus, the presence of one or more turbochargers can undesirably increase the risk that the temperature of such surfaces might exceed the 200° F. limit.

Accordingly, there is a need to address these and other shortcomings associated with forced induction marine engines.

SUMMARY

According to an exemplary embodiment of the invention, a heat shield for at least partially surrounding a turbocharger of a marine engine of a marine craft is provided. The heat shield includes an outer jacket including a fluid inlet port and a fluid outlet port, and an inner jacket nested within the outer jacket and spaced apart therefrom to define a fluid passageway therebetween, the fluid passageway being in fluid communication with the fluid inlet port and the fluid outlet port for directing a cooling fluid from the fluid inlet port to the fluid outlet port through the fluid passageway. The inner jacket at least partially defines a main cavity configured to receive a turbocharger of the marine engine. In one embodiment, the inner jacket is configured to be fixedly coupled to an outer surface of the marine engine and to at least partially encapsulate the turbocharger of the marine engine against the outer surface of the marine engine for thermally isolating the turbocharger from the outer jacket. In addition or alternatively, the heat shield may include first and second sidewalls fixedly coupled to the inner and outer jackets to laterally enclose the fluid passageway. At least one of the first and second sidewalls may include at least one opening for allowing one or more fluid conduits to pass therethrough to the main cavity.

In one embodiment, the inner and outer jackets each include a first portion configured to be positioned below the turbocharger, a second portion configured to be positioned alongside the turbocharger, and a third portion configured to be positioned above the turbocharger. The first portion may oppose the third portion. In addition or alternatively, the fluid passageway may have a generally C-shaped cross section. In one embodiment, the heat shield further includes an inner baffle positioned within the main cavity to divide the main cavity into a turbine chamber configured to receive a turbine of the turbocharger and a compressor chamber configured to receive a compressor of the turbocharger, wherein the inner baffle is configured to thermally isolate the turbine chamber and the compressor chamber from each other. The inner baffle may include an opening configured to allow a shaft of the turbocharger to pass therethrough between the turbine and compressor chambers.

In one embodiment, the inner jacket and the outer jacket include aligned openings configured to allow an oil conduit of the turbocharger to pass therethrough into the main cavity. In addition or alternatively, the cooling fluid may be raw water and the fluid inlet port may be configured to receive the raw water from a body of water in which the marine craft is configured to operate. In another embodiment, the cooling fluid is a synthetic cooling fluid circulated to the fluid passageway through a fluid circuit. In another embodiment, a marine craft includes the heat shield.

In another embodiment, in combination a turbocharger and a heat shield for a marine engine are provided. The combination includes the turbocharger including a turbine configured to extract energy from an exhaust stream, and an air compressor configured to compress ambient air into compressed air. The turbine is operatively coupled to the air compressor to transfer the extracted energy to the ambient air for compressing the ambient air into compressed air. The combination also includes the heat shield including an outer jacket including a fluid inlet port and a fluid outlet port. The heat shield also includes an inner jacket nested within the outer jacket and spaced apart therefrom to define a fluid passageway therebetween, the fluid passageway being in fluid communication with the fluid inlet port and the fluid outlet port for directing a cooling fluid from the fluid inlet port to the fluid outlet port through the fluid passageway. The inner jacket at least partially defines a main cavity, and the turbocharger is positioned within the main cavity.

The combination may further include a marine engine having at least one outer surface, wherein the inner jacket of the heat shield is fixedly coupled to the at least one outer surface of the marine engine to at least partially encapsulate the turbocharger against the at least one outer surface of the marine engine for thermally isolating the turbocharger from the outer jacket. In addition or alternatively, the heat shield may further include an inner baffle positioned within the main cavity to divide the main cavity into a turbine chamber and a compressor chamber, wherein the turbine of the turbocharger is positioned within the turbine chamber and the compressor of the turbocharger is positioned within the compressor chamber, and wherein the inner baffle is configured to thermally isolate the turbine and the compressor from each other. In another embodiment, the combination further includes the cooling fluid, wherein the cooling fluid is raw water and the fluid inlet port is configured to receive the raw water from a body of water in which the marine craft is configured to operate. In another embodiment, the combination further includes the cooling fluid, wherein the cooling fluid is a synthetic cooling fluid circulated to the fluid passageway through a fluid circuit.

In another embodiment, a method of thermally isolating a turbocharger associated with a marine engine of a marine craft from a surrounding environment is provided. The method includes at least partially encapsulating the turbocharger against at least one outer surface of the marine engine with a heat shield including an outer jacket and an inner jacket nested within the outer jacket and spaced apart therefrom to define a fluid passageway therebetween. The method also includes directing a cooling fluid through the fluid passageway. In one embodiment, directing the cooling fluid through the fluid passageway includes receiving the cooling fluid from a body of water in which the marine craft is operating.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The drawings, which are incorporated in and constitute a part of this specification, illustrate embodiments of the invention and, together with the general description given above and the detailed description given below, explain the embodiments of the invention.

DETAILED DESCRIPTION

Figure 1:
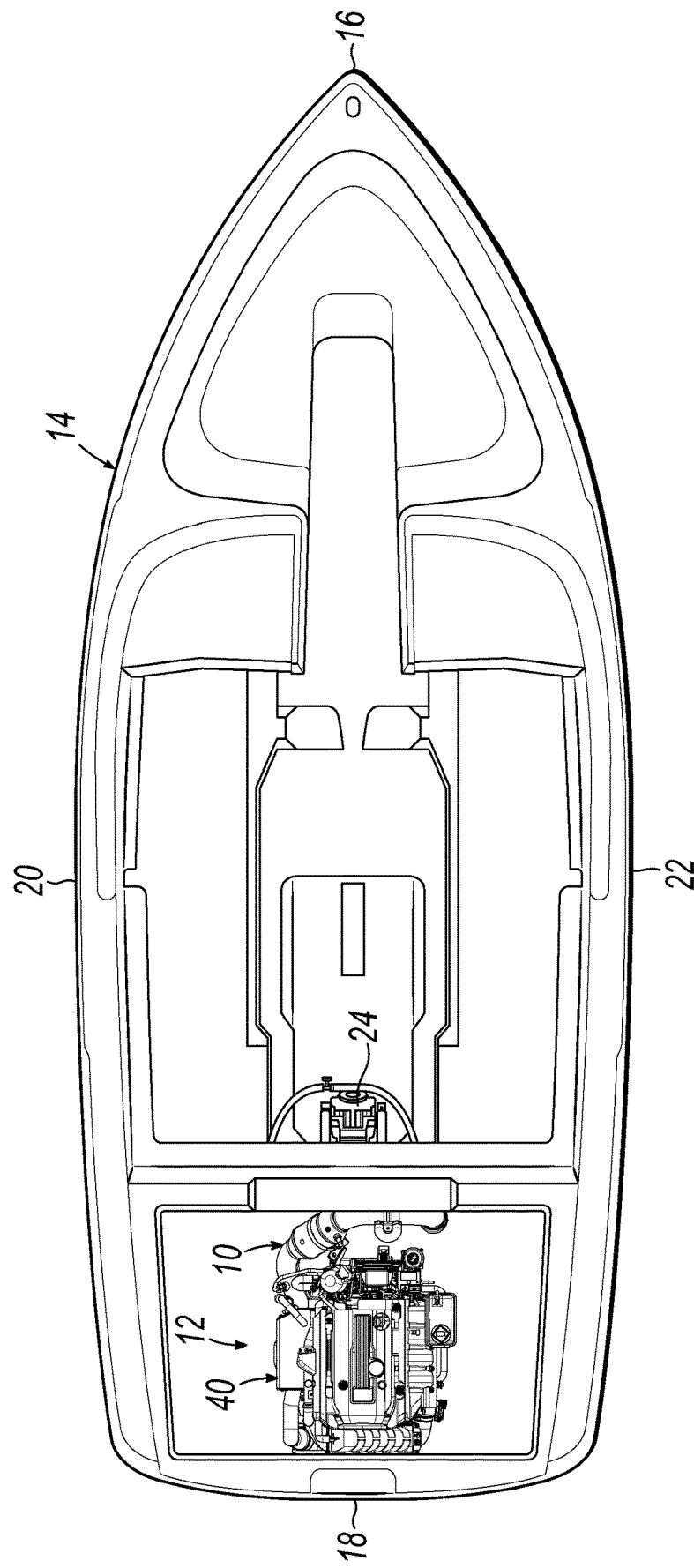
FIG. 1 is a top view of a motorboat including an inboard engine, an air intake and exhaust system coupled to the engine, and a heat shield at least partially encapsulating a turbocharger of the exhaust subsystem against the engine, in accordance with an exemplary aspect of the invention.
Figure 3:
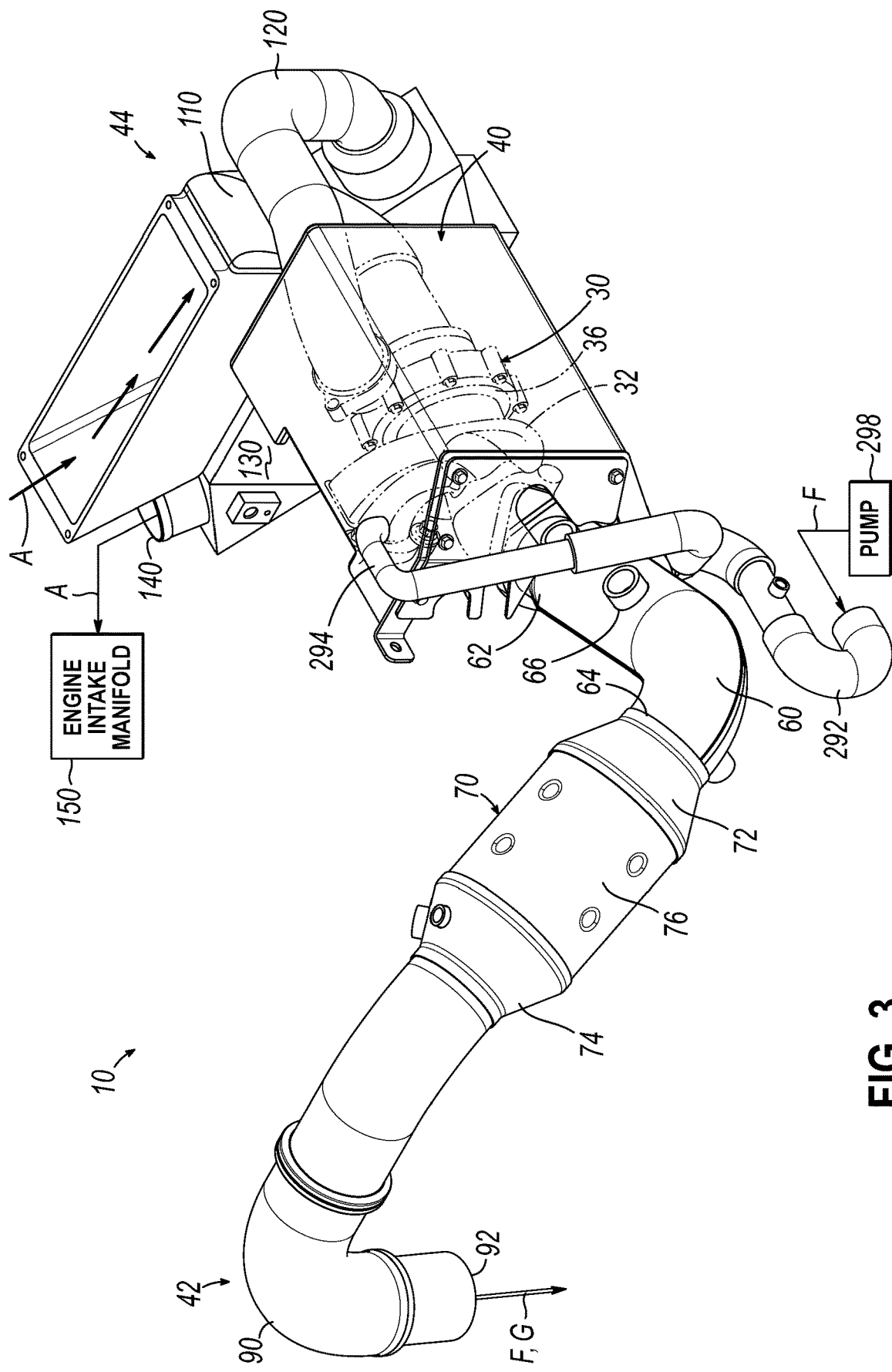
FIG. 3 is a front schematic view of the air intake and exhaust system of FIG. 2 with various components associated with the engine hidden from view, and showing the heat shield at least partially encapsulating the turbocharger.

Referring now to FIG. 1, an air intake and exhaust system 10 is shown mounted to a forced induction or "boosted" marine engine 12 within a marine craft such as a motorboat 14. The motorboat 14 includes a bow 16, a stern 18, a port side 20, and a starboard side 22. The engine 12 is shown mounted in an "inboard" configuration and is coupled to a V-drive transmission 24 that drives a propeller shaft and propeller (not shown) to rotate, which propels the motorboat 14 through the water. As shown in FIG. 3, the illustrated forced induction engine 12 is equipped with a turbocharger 30 including a radial turbine 32 and an air compressor such as a centrifugal compressor 36 (FIGS. 3 and 4) for increasing the efficiency and power output of the engine 12. As described in greater detail below, the turbocharger 30 is at least partially enclosed by an exemplary heat shield 40 according to an aspect of the invention to restrict the transfer of heat from the turbocharger 30 to surfaces which may come into contact with persons or gear carried by the motorboat 14.

Figure 2:
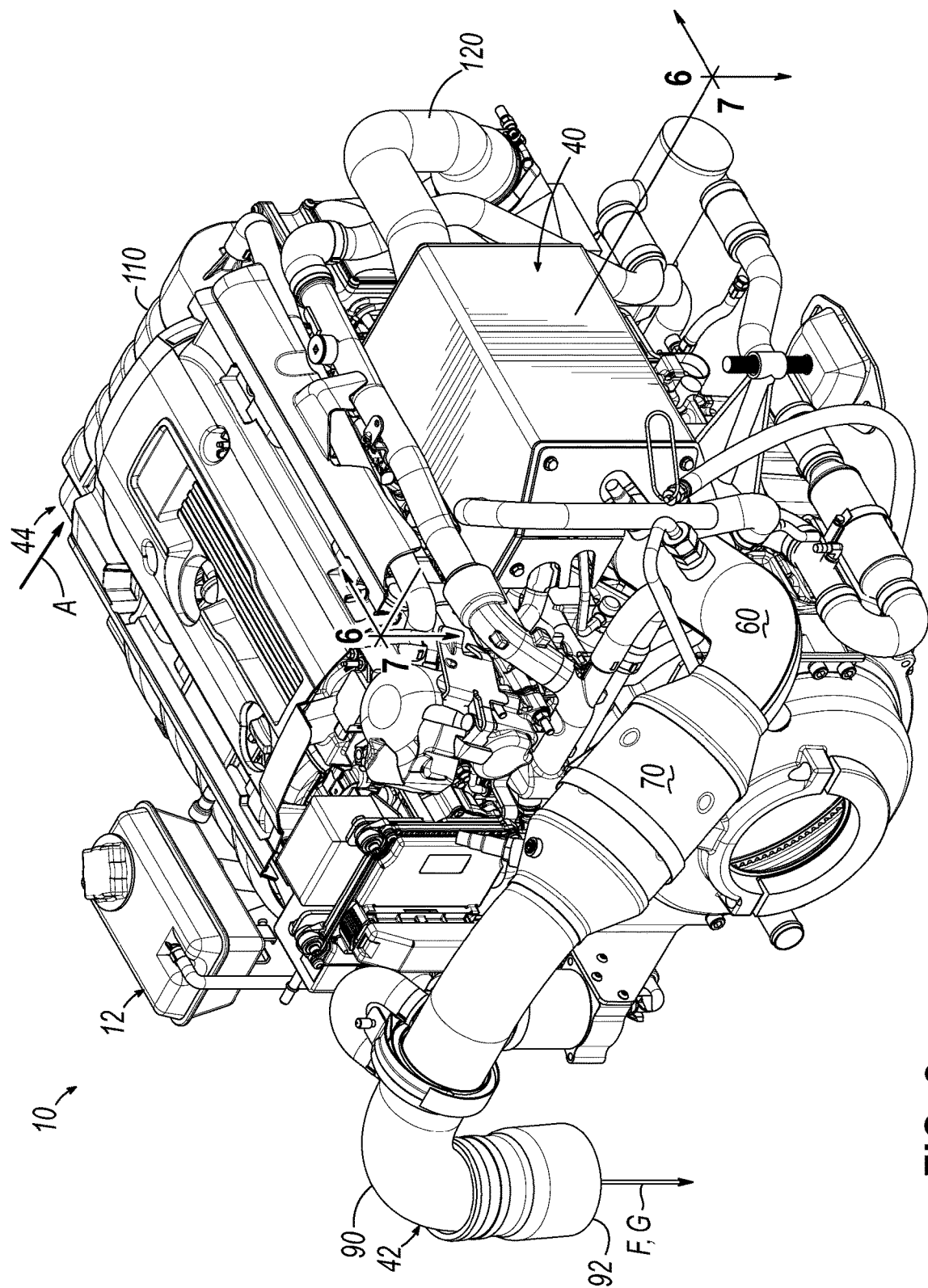
FIG. 2 is a front perspective view of the air intake and exhaust system of FIG. 1, showing the engine and various other components associated with the engine.
Figure 4:
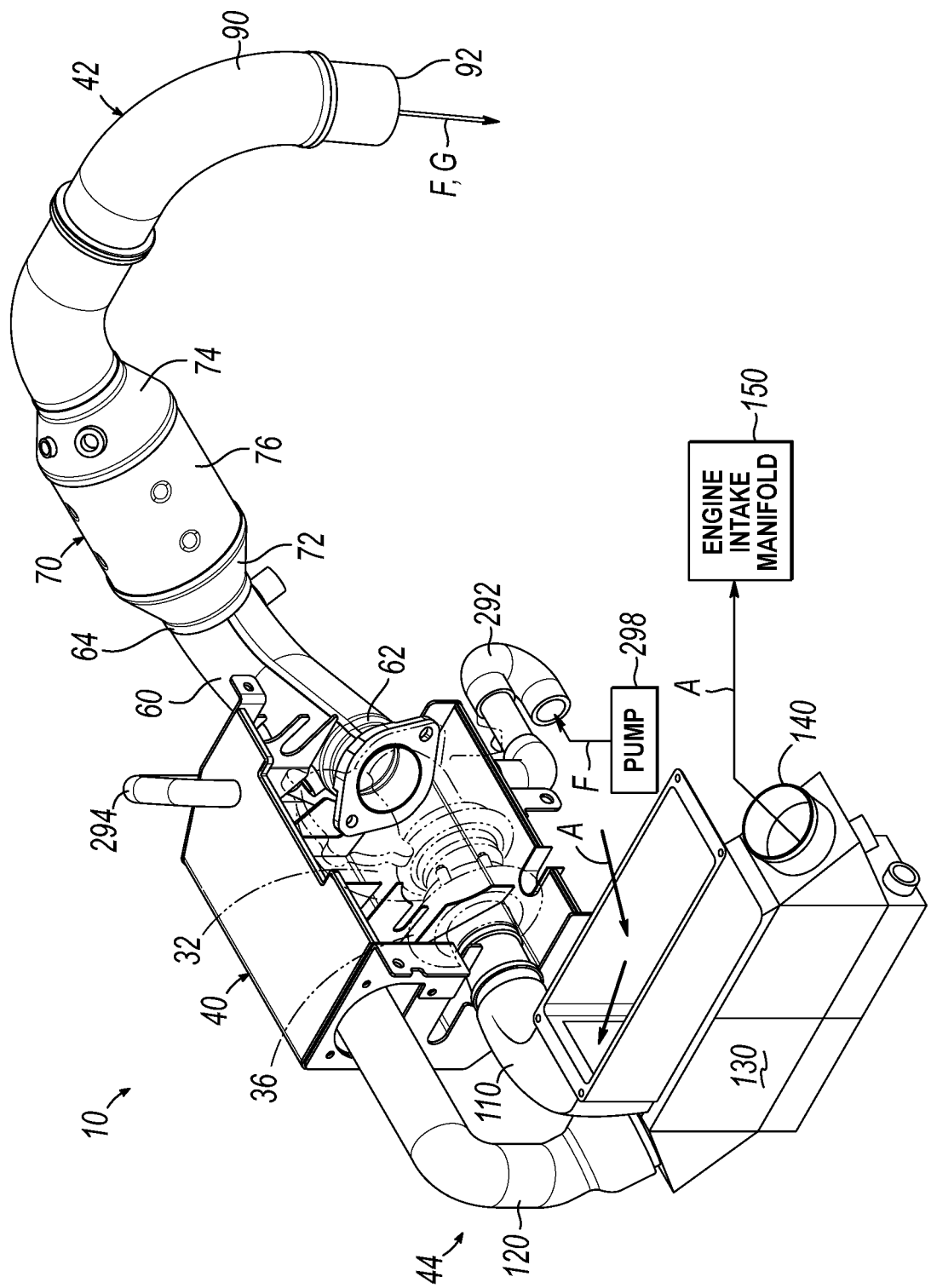
FIG. 4 is a rear schematic view of the air intake and exhaust system of FIG. 2 with various components associated with the engine hidden from view, and showing the heat shield at least partially encapsulating the turbocharger.

Referring now to FIGS. 2-4, the exemplary heat shield 40 is shown within the air intake and exhaust system 10 in greater detail, with various components associated with the engine 12 being hidden from view in FIGS. 3 and 4. In the embodiment shown, the air intake and exhaust system 10 includes an exhaust subsystem 42 and an air intake subsystem 44.

The exhaust subsystem 42 may generally include at least one exhaust manifold (not shown) that couples to at least one bank of cylinders of the engine 12. The at least one exhaust manifold may include a suitable number of exhaust inlet ports, each aligned in fluid communication with and receiving hot exhaust gases G expelled from a respective cylinder of the engine 12.

As best shown in FIGS. 3 and 4, the illustrated exhaust subsystem 42 further includes the turbine 32 of the turbocharger 30. More particularly, the turbine 32 is positioned downstream of and in fluid communication with the exhaust manifold for receiving exhaust gases G expelled therefrom. The turbine 32 is configured to extract energy from the flow of exhaust gases G which may then be transferred to the compressor 36. For example, a rotor (not shown) may be rotatably mounted within the turbine 32 so as to be driven by the exhaust gases G passing therethrough. The rotor of the turbine 32 may be operatively coupled to an impeller (not shown) of the compressor 36 which may be rotatably mounted within the compressor 36 such that rotation of the rotor may cause a corresponding rotation of the impeller. In this manner, the turbine 32 may extract energy from the exhaust gases G and the compressor 36 may transfer the extracted energy to fresh air A within the compressor 36, as described in greater detail below.

An exhaust conduit 60 is positioned downstream of and in fluid communication with the turbine 32 for receiving exhaust gases G expelled therefrom. The exhaust conduit 60 includes an exhaust inlet 62 positioned proximate to the turbine 32 and an exhaust outlet 64 positioned distal from the turbine 32. The illustrated exhaust conduit 60 also includes a secondary air inlet 66 positioned between the exhaust inlet and outlet 62, 64, the purpose of which is described in greater detail in U.S. Provisional Patent Application Ser. No. 62/804,790, filed on Feb. 13, 2019, the content of which is incorporated by reference in its entirety.

A catalytic converter assembly 70 is positioned downstream of and in fluid communication with the exhaust conduit 60 for receiving at least exhaust gases G expelled therefrom. The catalytic converter assembly 70 includes inlet and outlet cone portions 72, 74 that taper from an intermediate portion 76 having an enlarged diameter for accommodating a catalyst brick or element (not shown)

housed therein. The catalyst element is configured to remove toxic pollutants from the exhaust gases G.

The exhaust subsystem 42 also includes a tailpipe 90 positioned downstream of and in fluid communication with the catalytic converter assembly 70 for receiving at least the exhaust gases G expelled therefrom. The tailpipe 90 includes an exhaust subsystem outlet 92 for directing at least the exhaust gases G out of the exhaust subsystem 42 to an external environment.

The air intake subsystem 44 may generally include an air intake (not shown) having at least one air intake subsystem inlet for receiving fresh ambient air A from the external environment to be at least primarily directed to the engine 12 for combustion purposes, for example. An air intake duct 110 may be positioned downstream of and in fluid communication with the air intake for receiving the fresh ambient air A therefrom.

As best shown in FIGS. 3 and 4, the illustrated air intake subsystem 44 further includes the compressor 36 of the turbocharger 30. More particularly, the compressor 36 is positioned downstream of and in fluid communication with the air intake duct 110 for receiving the fresh ambient air A therefrom. The compressor 36 of the turbocharger 30 is configured to transfer energy extracted from the flow of exhaust gases G by the turbine 32, for example, to the ambient air A. In this regard, the impeller rotatably mounted within the compressor 36 may be configured to compress the air A via rotation of the impeller corresponding to rotation of the rotor of the turbine 32 caused by the exhaust gases G passing through the turbine 32.

A compressor outlet conduit 120 is positioned downstream of and in fluid communication with the compressor 36 for directing compressed air A therefrom to an intercooler 130 positioned downstream of and in fluid communication with the compressor outlet conduit 120. An intercooler outlet conduit 140 is positioned downstream of and in fluid communication with the intercooler 130 for directing at least a portion of the compressed air A to an intake manifold 150 of the engine 12. The interface between the intercooler outlet conduit 140 and the intake manifold may define a primary air injection location into the engine 12. Thus, the compressor 36 of the turbocharger 30 is fluidly coupled to the intake manifold of the engine 12 for directing at least a portion of the compressed air A to the intake manifold of the engine 12 to provide forced induction to the engine 12 such that the engine 12 may be "boosted."

In one embodiment, the intercooler outlet conduit 140 may include a secondary air outlet, a secondary air injection conduit may extend from the secondary air outlet to the secondary air inlet 66 of the exhaust conduit 60 and thus may bypass the engine 12 entirely, and a valve having a closed position and at least one open position may be positioned in-line with the secondary air injection conduit for selectively placing the intercooler outlet conduit 140 and exhaust conduit 60 in fluid communication with each other such that a second portion of the compressed air A may be directed from the intercooler outlet conduit 140 to the exhaust conduit 60 when the valve is in the open position (not shown). Thus, the secondary air inlet 66 may define a secondary air injection location into the exhaust stream G. In this manner, the compressor 36 of the turbocharger 30 may be selectively fluidly coupled to the catalytic converter assembly 70 for selectively directing a second portion of the compressed air A into the exhaust gas stream G at or upstream from the catalytic converter assembly 70 for assisting in catalysis, as described in greater detail in U.S. Provisional Patent Application Ser. No. 62/804,790, filed on Feb. 13, 2019, the content of which is incorporated by reference in its entirety.

In the embodiment shown, the turbocharger 30 is at least partially enclosed by the exemplary heat shield 40. More particularly, the heat shield 40 is mounted to an outer surface of the engine 12 to at least partially envelope or encapsulate the turbocharger 30 against the engine 12 for thermally isolating the turbocharger 30 from the surrounding environment.

Figure 5:
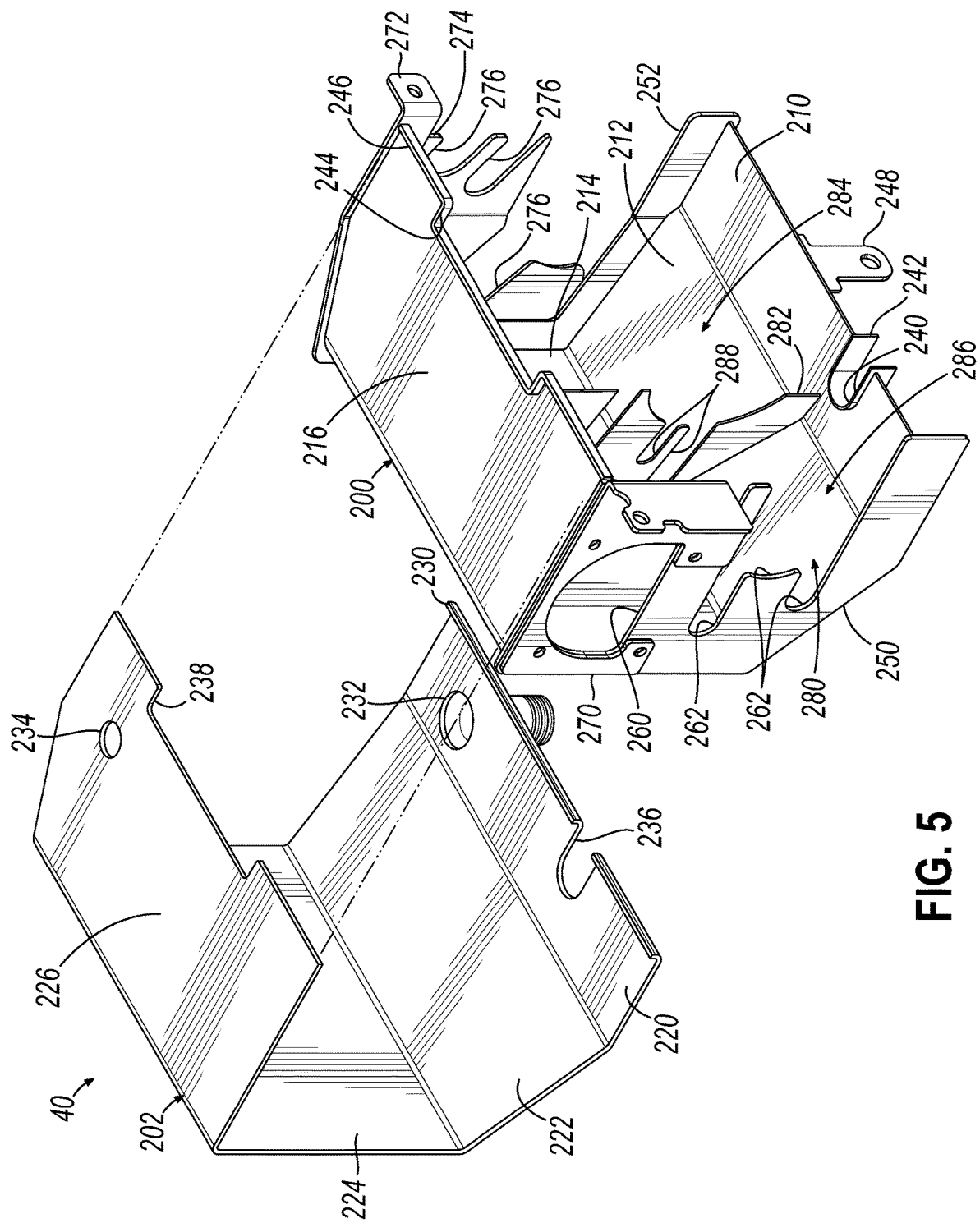
FIG. 5 is a disassembled view of the heat shield shown in FIG. 2.
Figure 6:
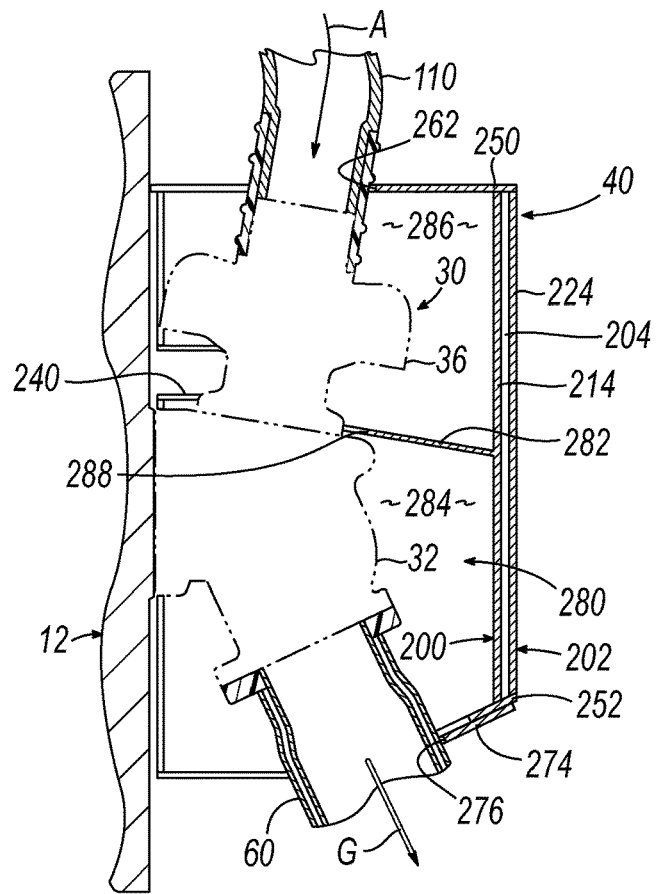
FIG. 6 is a cross sectional view of the heat shield shown in FIG. 2, taken along section line 6-6 in FIG. 2.
Figure 7:
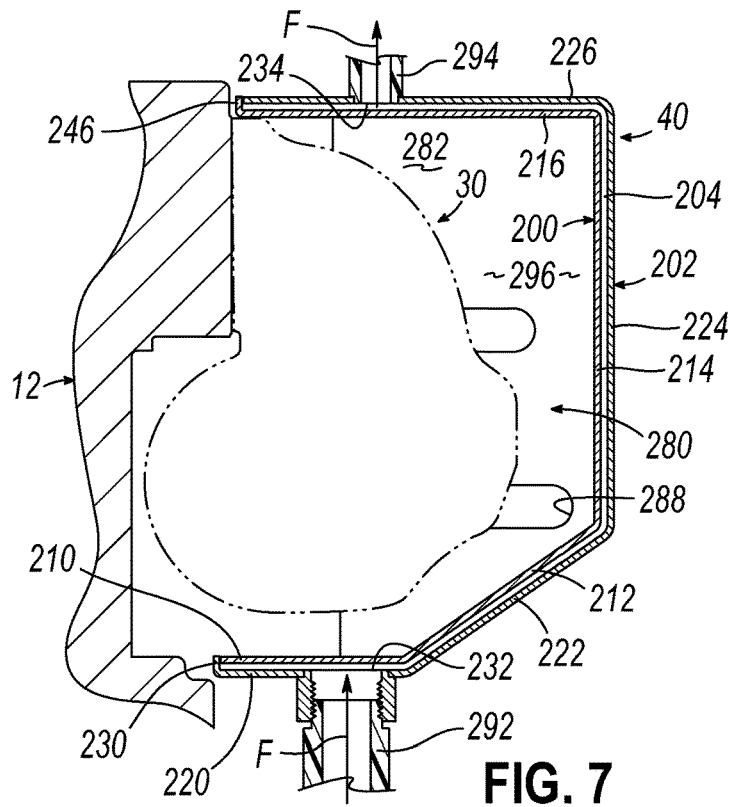
FIG. 7 is a cross sectional view of the heat shield shown in FIG. 2, taken along section line 7-7 in FIG. 2.

In this regard, and referring now to FIGS. 5-7, the illustrated heat shield 40 includes an inner jacket 200 and an outer jacket 202. As shown, the inner and outer jackets 200, 202 may have a same or substantially similar cross sectional shape and may be relatively sized such that the inner jacket 200 may be nested within the outer jacket 202 while being spaced apart therefrom to at least partially define a fluid passageway 204 therebetween. In the embodiment shown, the inner jacket 200 includes a generally horizontal first wall 210, a generally sloping second wall 212, a generally vertical third wall 214, and a generally horizontal fourth wall 216 opposite the first wall 210, respectively, such that the inner jacket 200 may have a generally C-shaped cross section. Similarly, the outer jacket 202 includes a generally horizontal first wall 220, a generally sloping second wall 222, a generally vertical third wall 224, and a generally horizontal fourth wall 226 opposite the first wall 220, respectively, such that the outer jacket 202 may also have a generally C-shaped cross section. The inner and outer jackets 200, 202 may be constructed of stainless steel, for example, or any other suitable material The illustrated outer jacket 202 includes a lip 230 extending upwardly from a terminal end of the first wall 220 thereof to close off the respective end of the fluid passageway 204. As shown, the first and fourth walls 220, 226 of the outer jacket 202 include a fluid inlet port 232 and a fluid outlet port 234, respectively, each configured to be in fluid communication with the fluid passageway 204 as described below. In the embodiment shown, the first wall 220 of the outer jacket 202 also includes an opening in the form of an outer oil access recess 236 for allowing an oil conduit (not shown) to pass therethrough and the fourth wall 226 of the outer jacket 202 also includes an elongate notch 238 for accommodating a portion of the engine 12, for example.

The illustrated inner jacket 200 includes an opening in the form of an inner oil access recess 240 configured to be aligned with the outer oil access recess 236 of the outer jacket 202 for allowing the oil conduit to pass therethrough, such as for lubricating a shaft operatively coupling the rotor (not shown) of the turbine 32 to the impeller (not shown) of the compressor 36. In the embodiment shown, a generally U-shaped barrier 242 is configured to abut the peripheries of the inner and outer oil access recesses 240, 236 to close off the fluid passageway 204 therefrom. In addition, the fourth wall 216 of the inner jacket 200 includes an elongate notch 244 configured to be aligned with the elongate notch 238 of the outer jacket 202 for accommodating a portion of the engine 12, for example, and an elongate barrier 246 is positioned between the inner and outer jackets 200, 202 at the terminal ends of the fourth walls 216, 226 thereof to close off the respective end of the fluid passageway 204. In the embodiment shown, a downwardly-extending tab 248 is provided at the terminal end of the first wall 210 of the inner jacket 200 for fixedly coupling the inner jacket 200 to an outer surface of the engine 12, for example.

As shown, the heat shield 40 also includes first and second sidewalls 250, 252. The sidewalls 250, 252 may each have a profile generally corresponding to the cross sectional shape of the jackets 200, 202 and may be sized relative thereto to close off the fluid passageway 204 at the sides thereof such that the fluid passageway 204 is laterally bounded or enclosed by the sidewalls 250, 252. For example, the sidewalls 250, 252 may each have a generally C-shaped profile. In any event, the sidewalls 250, 252 are fixedly coupled to each of the jackets 200, 202 at their respective locations, such as by welding, in order to provide a fluid-tight connection therebetween. In the embodiment shown, the first sidewall 250 includes openings in the form of an aperture 260 and a first multi-stage recess 262 for allowing various components, such as conduits associated with the turbocharger 30, to pass therethrough. For example, the aperture 260 in the first sidewall 250 may be configured for allowing the compressor outlet conduit 120 to pass therethrough, and the first multi-stage recess 262 in the first sidewall 250 may be configured for allowing at least the air intake duct 110 to pass therethrough, for routing air A to and from the compressor 36 of the turbocharger 30, as shown in FIG. 6.

First and second brackets 270, 272 are configured to fixedly couple the first and second sidewalls 250, 252 to an outer surface of the engine 12, respectively. In the embodiment shown, the first bracket 270 is configured to be removably coupled to the first sidewall 250 above the first multi-stage recess 262 and is sized and configured to partially surround the aperture 260 in the first sidewall 250 to avoid interfering with the passage of the compressor outlet conduit 120 through the aperture 260 and to avoid interfering with the passage of the air intake duct 110 through the first multi-stage recess 262. The illustrated second bracket 272 is integrally formed together with the second sidewall 252 as a unitary piece.

As shown in FIG. 5, a cover 274 is removably coupled to the second sidewall 252 and includes an opening in the form of a second multi-stage recess 276 for allowing various components, such as conduits associated with the turbocharger 30, to pass therethrough. For example, as shown in FIG. 6, the second multi-stage recess 276 in the cover 274 may be configured for allowing at least the exhaust conduit 60 to pass therethrough, for routing exhaust gases G from the turbine 32 of the turbocharger 30. Various other configurations of the sidewalls 250, 252, respective brackets 270, 272, and/or cover 274 may be used as may be desired. The sidewalls 250, 252, brackets 270, 272, and/or cover 274 may be constructed of stainless steel, for example, or any other suitable material.

As best shown in FIGS. 6 and 7, the inner jacket 200, sidewalls 250, 252, and at least one outer surface of the engine 12 collectively define a main cavity 280 for at least partially encapsulating the turbocharger 30. As shown in FIG. 6, an inner baffle 282 welded or otherwise secured to the inner jacket 200 is positioned within the main cavity 280 between the turbine 32 and the compressor 36 to divide the main cavity 280 into a turbine chamber 284 for receiving the turbine 32 and a compressor chamber 286 for receiving the compressor 36. The inner baffle 282 may assist in thermally isolating the turbine chamber 284 and the compressor chamber 286 from each other. In this regard, the inner baffle 282 may inhibit heat transfer between the turbine chamber 284 and the compressor chamber 286, and thus between the turbine 32 and the compressor 36 of the turbocharger 30. For example, during normal operation the temperature of the turbine 32 may be approximately 1,800° F. while the temperature of the compressor 36 may be approximately 400° F. The illustrated inner baffle 282 includes an opening in the form of a third multi-stage recess 288 for allowing various components, such as conduits associated with the turbocharger 30, to extend therethrough between the turbine chamber 284 and the compressor chamber 286. For example, the third multi-stage recess 288 in the inner baffle 282 may be configured for allowing at least a shaft operatively coupling the rotor of the turbine 32 to the impeller of the compressor 36 to pass therethrough. Various other configurations of the inner baffle 282 may be used as may be desired. The inner baffle 282 may be constructed of stainless steel, for example, or any other suitable material.

As best shown in FIG. 7, the inner and outer jackets 200, 202 are spaced apart from each other to define the fluid passageway 204 which extends or wraps at least partially about the turbocharger 30. For example, the first walls 210, 220 of the inner and outer jackets 200, 202, respectively, are positioned below the turbocharger 30, the second walls 212, 222 extend from below the turbocharger 30 to alongside the turbocharger 30, the third walls 214, 224 are positioned alongside the turbocharger 30, and the fourth walls 216, 226 are positioned above the turbocharger 30. In this manner, the illustrated fluid passageway 204 extends from a position below the turbocharger 30, alongside the turbocharger 30, to a position above the turbocharger 30 such that the fluid passageway 204 has a generally C-shaped cross section and substantially surrounds the bottom of the turbocharger 30, the side of the turbocharger 30 opposite the engine 12, and the top of the turbocharger 30. Thus, the fluid passageway 204 is substantially between the turbocharger 30 and any persons or gear carried by the motorboat 14 which might otherwise be capable of contacting the turbocharger 30.

As shown in FIG. 7, a cooling fluid F may be directed from the fluid inlet port 232, through the fluid passageway 204, to the fluid outlet port 234. Cooling fluid F may be supplied to the fluid inlet port 232 by a cooling fluid inlet conduit 292 and may be discharged from the fluid outlet port 234 into a cooling fluid outlet conduit 294, for example. See FIGS. 4 and 7.

By directing the cooling fluid F through the passageway 204 at least partially about the turbocharger 30 and substantially between the turbocharger 30 and any persons or gear carried by the motorboat 14, the heat shield 40 may assist in thermally isolating the main cavity 280 from the surrounding environment such as the exterior of the heat shield 40. In this regard, the cooling fluid F may inhibit heat transfer between the main cavity 280 and the outer jacket 202 of the heat shield 40, and thus between the turbocharger 30 and the exterior of the heat shield 40. For example, the surface temperature of the outer jacket 202 may remain at or below 200° F. while the temperature of the turbine 32 may be approximately 1,800° F. and while the temperature of the compressor 36 may be approximately 400° F.

In the embodiment shown, the turbocharger 30 is spaced apart from the inner jacket 200 of the heat shield 40 by an air gap 296. In other words, the turbocharger 30 is not in direct physical contact with the inner jacket 200 of the heat shield 40. The air gap 296 may allow the temperature of the exhaust gases G in the turbine 32 of the turbocharger 30 to be substantially unaffected by the relatively low temperature of cooling fluid F flowing through the passageway 204 so that the temperature of the exhaust gases G may remain relatively high, such as for efficient emissions reduction. For example, the air gap 296 may be between approximately ½ inch and approximately 1 inch.

In one embodiment, the cooling fluid F may be water. For example, the cooling fluid inlet conduit 292 may receive "raw" water drawn from the body of water (e.g., lake or ocean) in which the motorboat 14 is operating via a water pump 298. See FIG. 4. Any other suitable cooling fluid F may be used, such as a synthetic coolant mixture (e.g., glycol), which may be circulated to the fluid passageway 204 through a fluid circuit (not shown) including the fluid inlet and outlet conduits 292, 294. The cooling fluid F may be used for other cooling purposes associated with the engine 12, such as for cooling the compressed air A within the intercooler 130 and/or for cooling the outer surfaces of the exhaust subsystem 42, before and/or after being directed through the fluid passageway 204 of the heat shield 40. For example, the fluid outlet conduit 294 may direct the cooling fluid F to one or more cooling jackets surrounding the catalytic converter assembly 70 similar to the cooling jackets described in U.S. Pat. No. 9,957,863, the content of which is incorporated by reference in its entirety. The cooling fluid F may flow through such cooling jackets in a direction parallel to the flow of the exhaust gases G, without contacting the exhaust gases G. Ultimately, the cooling fluid F may be combined with the exhaust gases G downstream of the catalytic converter assembly 70 and ejected together with the exhaust gases G through the exhaust subsystem outlet 92 to the environment.

In this manner, the heat shield 40 may effectively thermally isolate the turbocharger 30 from the surrounding exterior environment. In one embodiment, the heat shield 40 may allow a conventional automotive turbocharged engine to be marinized without recasting the turbocharger of such an engine with an integral water jacket. In other words, a preexisting automotive turbocharged engine may be easily retrofitted with the heat shield 40 so as to be suitable for use in marine applications.

While the turbine 32 and compressor 36 of the turbocharger 30 have been shown and described as a radial turbine and centrifugal compressor, respectively, it will be appreciated that the turbine 32 and compressor 36 may be configured in any other suitable manner for compressing the air A by extracting energy from the exhaust gases G. For example, the turbine 32 and/or compressor 36 may be axially configured. Moreover, while the illustrated forced induction engine 12 is equipped with the turbocharger 30 including the turbine 32 and the compressor 36, other suitable forced induction devices may be used. For example, the engine 12 may be equipped with a supercharger having an air compressor driven by a belt connected to a crankshaft (not shown) of the engine 12, rather than by the illustrated turbine 32 and exhaust stream G. In such cases, the heat shield 40 may at least partially enclose the compressor. In other embodiments, the engine 12 may be equipped with multiple turbochargers and/or superchargers. For example, the engine 12 may be equipped with a twin turbocharger (e.g., having two turbochargers 30) or twin supercharger (e.g., having two superchargers). In such cases, multiple heat shields 40 corresponding to the number of turbochargers or superchargers may be used, for example.

The physical configurations of the air intake and exhaust system 10 as shown in the accompanying drawings are merely exemplary. The components of the air intake and exhaust systems 10 may be configured and arranged in any suitable manner. For example, the various conduits described herein may extend for any desired length and with any configuration suitable for directing the exhaust gases G, air A, and cooling fluid F to the respective destinations. For example, the tailpipe 90 may extend externally through a transom or a side of the hull of the motorboat 14, and may include an exhaust tip (not shown) of various types known in the art, for example.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A heat shield for at least partially surrounding a turbocharger of a marine engine of a marine craft, the heat shield comprising:
    an outer jacket including a fluid inlet port and a fluid outlet port; and
    an inner jacket nested within the outer jacket and spaced apart therefrom to define a fluid passageway therebetween, the fluid passageway being in fluid communication with the fluid inlet port and the fluid outlet port for directing a cooling fluid from the fluid inlet port to the fluid outlet port through the fluid passageway,
    wherein the inner jacket at least partially defines a main cavity configured to receive the turbocharger of the marine engine,
    the heat shield further comprising an inner baffle positioned within the main cavity to divide the main cavity into a turbine chamber configured to receive a turbine of the turbocharger and a compressor chamber configured to receive a compressor of the turbocharger, wherein the inner baffle is configured to thermally isolate the turbine chamber and the compressor chamber from each other.

2. The heat shield of claim 1, wherein the inner jacket is configured to be fixedly coupled to an outer surface of the marine engine and to at least partially encapsulate the turbocharger of the marine engine against the outer surface of the marine engine for thermally isolating the turbocharger from the outer jacket.

3. The heat shield of claim 1, further comprising:
    first and second sidewalls fixedly coupled to the inner and outer jackets to laterally enclose the fluid passageway.

4. The heat shield of claim 3, wherein at least one of the first and second sidewalls includes at least one opening for allowing one or more fluid conduits to pass therethrough to the main cavity.

5. The heat shield of claim 1, wherein the inner and outer jackets each include a first portion configured to be positioned below the turbocharger, a second portion configured to be positioned alongside the turbocharger, and a third portion configured to be positioned above the turbocharger.

6. The heat shield of claim 5, wherein the first portion opposes the third portion.

7. The heat shield of claim 1, wherein the fluid passageway has a generally C-shaped cross section.

8. The heat shield of claim 1, wherein the inner baffle is made of stainless steel.

9. The heat shield of claim 1, wherein the inner baffle includes an opening configured to allow a shaft of the turbocharger to pass therethrough between the turbine and compressor chambers.

10. A heat shield for at least partially surrounding a turbocharger of a marine engine of a marine craft, the heat shield comprising:

an outer jacket including a fluid inlet port and a fluid outlet port; and an inner jacket nested within the outer jacket and spaced apart therefrom to define a fluid passageway therebetween, the fluid passageway being in fluid communication with the fluid inlet port and the fluid outlet port for directing a cooling fluid from the fluid inlet port to the fluid outlet port through the fluid passageway, wherein the inner jacket at least partially defines a main cavity configured to receive the turbocharger of the marine engine and wherein the inner jacket and the outer jacket include aligned openings configured to allow an oil conduit of the turbocharger to pass therethrough into the main cavity.

11. The heat shield of claim 1, wherein the cooling fluid is raw water and the fluid inlet port is configured to receive the raw water from a body of water in which the marine craft is configured to operate.

12. The heat shield of claim 1, wherein the cooling fluid is a synthetic cooling fluid circulated to the fluid passageway through a fluid circuit.

13. A marine craft including the heat shield of claim 1.

14. In combination a turbocharger and a heat shield for a marine engine, the combination comprising:

the turbocharger including:
a turbine configured to extract energy from an exhaust stream; and
an air compressor configured to compress ambient air into compressed air,
wherein the turbine is operatively coupled to the air compressor to transfer the extracted energy to the ambient air for compressing the ambient air into compressed air; and the heat shield including:
an outer jacket including a fluid inlet port and a fluid outlet port; and
an inner jacket nested within the outer jacket and spaced apart therefrom to define a fluid passageway therebetween, the fluid passageway being in fluid communication with the fluid inlet port and the fluid outlet port for directing a cooling fluid from the fluid inlet port to the fluid outlet port through the fluid passageway,
wherein the inner jacket at least partially defines a main cavity, and wherein the turbocharger is positioned within the main cavity and wherein the heat shield further includes an inner baffle positioned within the main cavity to divide the main cavity into a turbine chamber and a compressor chamber, wherein the turbine of the turbocharger is positioned within the turbine chamber and the compressor of the turbocharger is positioned within the compressor chamber, and wherein the inner baffle is configured to thermally isolate the turbine and the compressor from each other.

15. The combination of claim 14, further comprising:
a marine engine having at least one outer surface, wherein the inner jacket of the heat shield is fixedly coupled to the at least one outer surface of the marine engine to at least partially encapsulate the turbocharger against the at least one outer surface of the marine engine for thermally isolating the turbocharger from the outer jacket.

16. The combination of claim 14, wherein the inner baffle includes an opening for allowing various components associated with the turbocharger to extend therethrough between the turbine chamber and the compressor chamber.

17. The combination of claim 14, further comprising:
the cooling fluid, wherein the cooling fluid is raw water and the fluid inlet port is configured to receive the raw water from a body of water in which the marine craft is configured to operate.

18. The combination of claim 14, further comprising:
the cooling fluid, wherein the cooling fluid is a synthetic cooling fluid circulated to the fluid passageway through a fluid circuit.

19. A method of thermally isolating a turbocharger associated with a marine engine of a marine craft from a surrounding environment, the method comprising: at least partially encapsulating the turbocharger against at least one outer surface of the marine engine with a heat shield including an outer jacket and an inner jacket nested within the outer jacket and spaced apart therefrom to define a fluid passageway therebetween, thermally isolating a turbine of the turbocharger from a compressor of the turbocharger by an inner baffle positioned within a main cavity of the heat shield; and directing a cooling fluid through the fluid passageway.

20. The method of claim 19, wherein directing the cooling fluid through the fluid passageway includes receiving the cooling fluid from a body of water in which the marine craft is operating.

* * * * *